Dec. 2, 1958 B. SHAW ET AL 2,862,335
APPARATUS FOR RESHAPING CYLINDRICAL GLASS TUBES
Filed June 12. 1957 5 Sheets-Sheet 1

Fig. 1.

Inventors:
Bernard Shaw,
John Salo,
Paul Barclay,
by Otto Vichy
Their Attorney.

Dec. 2, 1958  B. SHAW ET AL  2,862,335
APPARATUS FOR RESHAPING CYLINDRICAL GLASS TUBES
Filed June 12, 1957  5 Sheets-Sheet 3

Fig. 3.

Inventors:
Bernard Shaw,
John Salo,
Paul Barclay,
by Otto Tichy
Their Attorney.

United States Patent Office 2,862,335
Patented Dec. 2, 1958

2,862,335

APPARATUS FOR RESHAPING CYLINDRICAL GLASS TUBES

Bernard Shaw, Mayfield Heights, John Salo, Euclid, and Paul Barclay, Willowick, Ohio, assignors to General Electric Company, a corporation of New York Application June 12, 1957, Serial No. 665,201

7 Claims. (Cl. 49—7)

The present invention relates to apparatus for reshaping hollow glass bodies and more particularly the invention relates to apparatus for reshaping elongated cylindrical glass tubes used as envelopes for evacuated electric discharge devices, such as double-ended tubular fluorescent discharge lamps.

The copending joint application Serial No. 578,772, filed April 17, 1956, of Eugene Lemmers and two of the present applicants, which application is assigned to the assignee of the present application, discloses and claims an elongated vitreous envelope for an evacuated electric device of generally tubular form, for example, a fluorescent discharge lamp, having longitudinally extending, transversely re-entrant groove sections spaced apart from each other along one side of the envelope and forming panels defining a discharge space within the envelope of the general cross section of a sector of an annulus. Between the groove sections the envelope has upstanding portions or ribs of generally circular cross section for strengthening the envelope against implosions. A fluorescent discharge lamp provided with such an envelope is also disclosed and claimed and a method of making the envelope together with a press bar or die plunger useful for shaping the envelope is disclosed in the above copending application.

The method of making the envelope and the structure of the die plunger useful in carrying out the method is the invention of two of the present applicants, Shaw and Salo, and is disclosed and claimed in their copending application Serial No. 651,301, filed April 8, 1957, and assigned to the assignee of the present application.

The method of making the envelope disclosed in the copending applications referred to above comprises the steps of heating an open-ended, cylindrical vitreous body or glass tube, which has previously been provided with finished annularly reduced or shouldered end walls to adapt it for use as a fluorescent lamp envelope, to a temperature slightly below the softening temperature of the glass, heating selected separated areas along one side of the tube to a temperature at which the glass in said areas is softened and becomes plastic, reshaping the tube at the separated plastic areas by folding the tube wall in said areas inwardly to form re-entrant grooves in said areas and to leave upstanding ribs between the reshaped areas or portions of the tube.

The die plunger disclosed in the above-identified copending applications is elongated and has longitudinally extending protuberances spaced apart therealong so as to engage the separated plastic portions only of the tubular envelope. Each of the protuberances present a surface to the tube which surface is rounded in cross section and has a radius of curvature substantially smaller than that of the tube. The plastic tube portions are folded inwardly by the protuberances on the plunger to form spaced re-entrant grooves in the tube wall when the plunger is moved toward the longitudinal axis of the tube.

The principal object of the present invention is to provide a species of apparatus utilizing the die plunger and for automatically carrying out the steps of the method disclosed and claimed in the copending application of Shaw and Salo to produce the lamp envelope disclosed and claimed in the Lemmers' et al. copending application. Other objects and advantages of the invention will appear from the following detailed description of the species thereof, from the accompanying drawings and the appended claims.

An important feature of the apparatus embodying the invention is a heated press bed or mold for supporting in a horizontal position the open-ended tubular glass envelope or blank to be reshaped. The mold conforms in shape to the lower half of the blank and is mounted for movement on the apparatus into a first position in which the heated mold accepts a pre-heated glass blank, a second position in which the selected portions of the blank to be reshaped are heated to the temperature at which the glass at said portions become plastic and thence to a third position in which the plastic portions of the blank are reshaped and the blank thereafter removed from the mold. The mold is movable directly from its third position to its first position on the apparatus after removal of the reshaped blank therefrom to accept and carry a succeeding preheated blank to the second and then the third positions of the mold.

Another feature of the apparatus is a preheat mechanism for the glass blank which heats the entire blank to a temperature slightly below the softening temperature of the glass and delivers the blank so heated to the mold when the latter is moved from its third into its first position.

A further feature of the apparatus is an elongated segmented burner mounted in a horizontal position on the apparatus and above the space occupied by the mold in its second position. The segmented burner directs a plurality of longitudinally extending, spaced apart flames downward toward the mold when the mold is in its second position to heat only selected longitudinally extending spaced apart portions of the exposed upper half of the preheated glass blank in the mold to a temperature at which the glass in said portions is plastic.

The apparatus includes a press bar or die plunger of the type disclosed in the copending applications for folding the plastic portions of the blank inwardly to form spaced, transversely re-entrant grooves extending longitudinally along one side of the blank when the mold is in its third position. For this purpose the die plunger is supported horizontally on the apparatus and is mounted for reciprocation in a plane between a raised position and a lowered position with respect to the mold so that the protuberances on the plunger engage and fold inward the plastic portions of the blank when the mold is in its third position.

The apparatus also includes means for feeding tubular glass blanks to the preheat mechanism at the front of the apparatus and means at the back of the apparatus for removing reshaped blanks from the mold after the die plunger has been lifted from its lowered to its raised position and while the mold is in its third position.

Operating means and timing mechanisms of commercial structure are incorporated in the apparatus for actuating the above described components in a time sequence effective for reshaping automatically a series of tubular glass blanks.

In the drawings accompanying and forming part of this specification an apparatus or machine embodying the invention is shown, in which:

Fig. 5 is a side elevational view of the driving means for part of the preheat mechanism, the mechanism being shown at an alternate position thereof in dot-dash lines and, Fig. 6 is a vertical section taken along line 6—6 of Fig. 1 and showing the plunger, the mold and the parts of the machine adjacent thereto with the plunger at the bottom of its stroke and a reshaped blank in the mold.

Like numbers denote like parts in all the figures.

Figure 1:
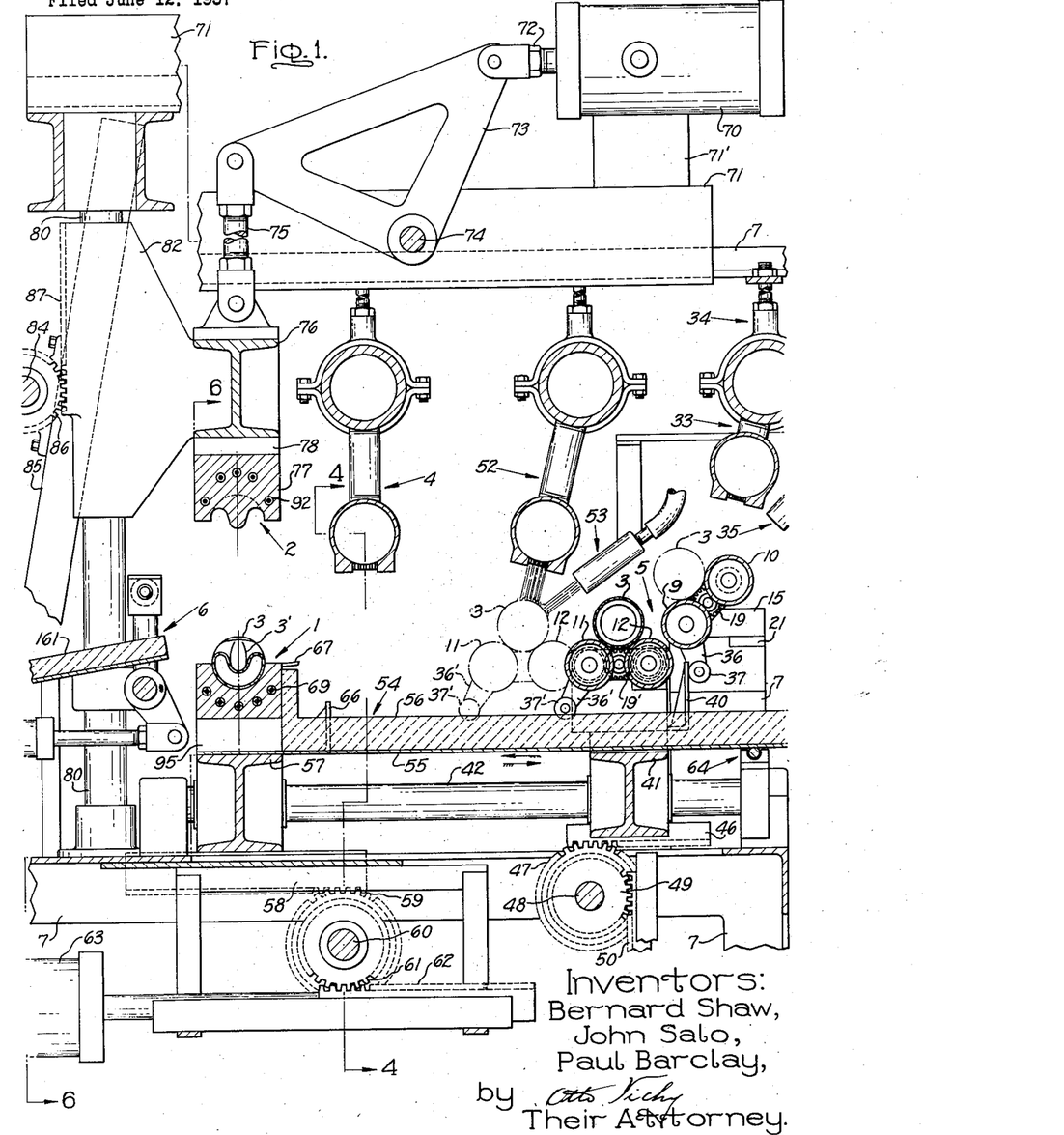
Fig. 1 is a vertical sectional view taken from front to back through a slightly off-center portion of the machine and showing the mold in its third position with a reshaped blank therein and showing also another blank in the preheat mechanism of the apparatus.
Figure 2:
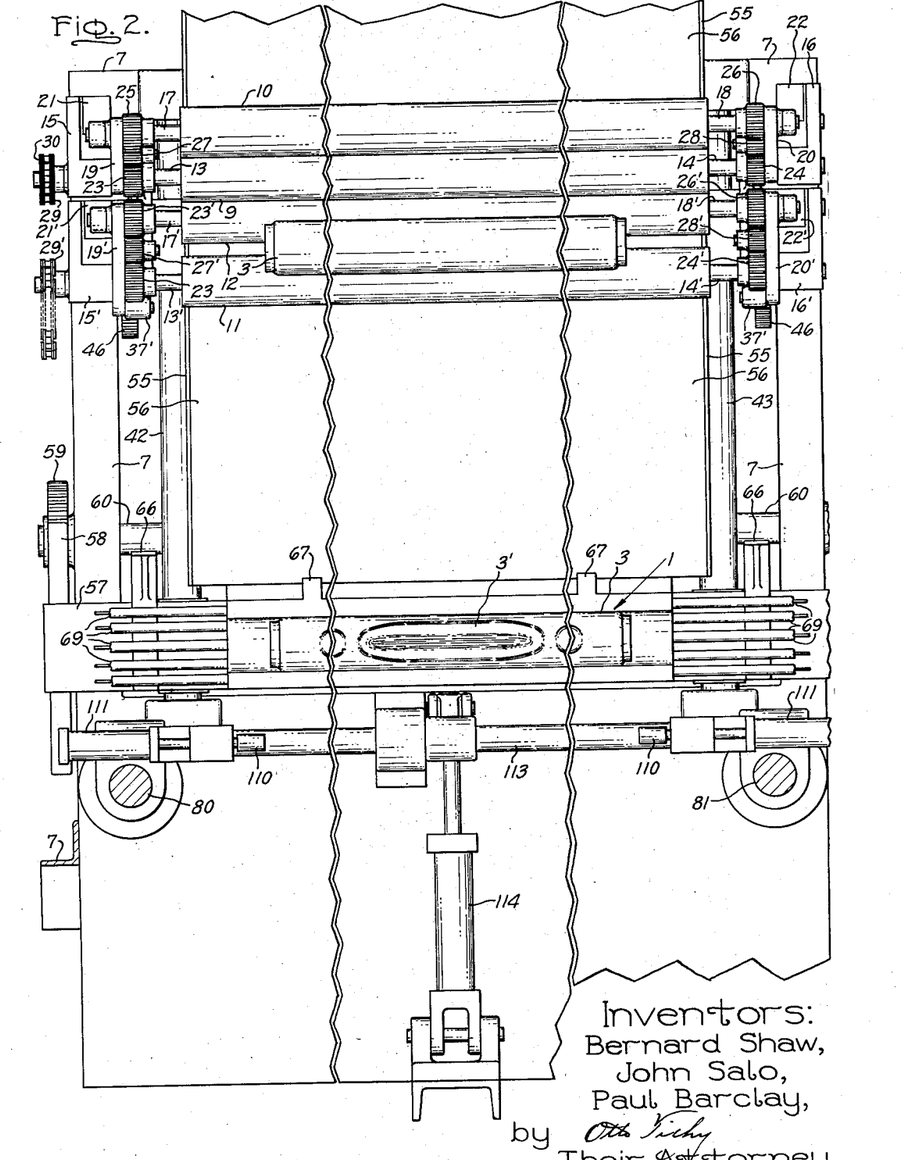
Fig. 2 is a plan view of the blank supporting parts of the machine with intermediate side portions of the machine broken therefrom and with the parts illustrated in the relative positions shown in Fig. 1.
Figures 5, 6:
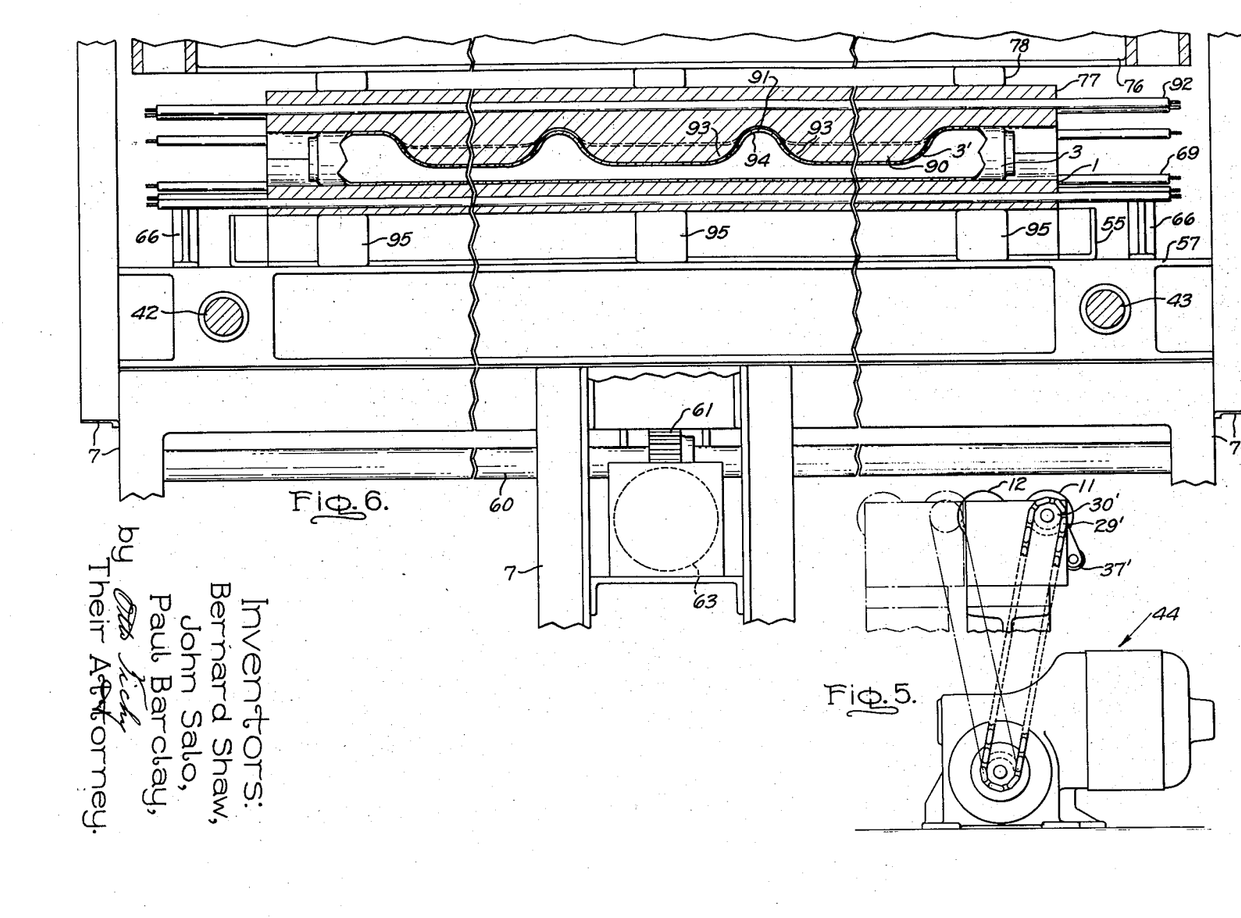

Referring to Figs. 1 and 2 of the drawings the mold 1, which is part of a movable carriage or subassembly, is shown in its third position with the plunger 2 (Fig. 1) in a raised position with respect thereto after the grooves 3' have been formed in the blank 3. The elongated segmented gas-air burner 4 is shown in Fig. 1 with the flame thereof turned off and the preheat mechanism 5 is shown in full lines at the right of Figs. 1 and 2 just after a succeeding blank 3 has been transferred from one part to another of the preheat mechanism. The blank removing means is shown, in part, at 6 in Fig. 1. The frame parts supporting the components of the machine are shown at 7 in the drawings.

In describing the machine and its various component parts, a complete cycle of operation involving the reshaping of a single blank will be described and it will be understood that the machine repeats automatically the cycle of operation described to reshape a series of blanks.

A blank 3 is delivered to the preheat mechanism 5 by the blank feeding means 8 mounted at the front of the machine and shown at the left of Fig. 3 and which is described later herein.

As shown in Fig. 1 the preheat mechanism comprises two subassemblies one of which includes a pair of horizontal spaced parallel rollers 9 and 10 and the other of which includes a similar pair of rollers 11 and 12. The subassembly including the rollers 9 and 10 is affixed to the frame 7 at the first preheat station whereas the subassembly including the rollers 11 and 12 is movable horizontally on the frame of the machine between a position whereat it receives a blank from the subassembly at the first preheat station and a position removed therefrom which is the second preheat station of the machine. In Fig. 1 the movable subassembly is shown in full lines in its blank receiving position and in broken lines at the second preheat station. Each pair of rollers 9 and 10, 11 and 12 form a trough in which a blank 3 is received during operation of the machine.

Except for the parts required to support and move along the frame 7 the subassembly including the rollers 11 and 12, this movable subassembly is identical in structure in most respects with that of the stationary subassembly including the rollers 9 and 10. Thus, in the following description of the stationary subassembly shown in Figs. 1 and 2, it will be understood that the parts described have corresponding parts in the movable subassembly. For simplicity in description and illustration, like parts of the two subassemblies have been denoted by like numbers with the number of the movable subassembly primed in order to avoid repetition needless for a complete understanding of the invention.

The roller 9 of the stationary subassembly at the first preheat station is supported at its opposite ends by spindles 13 and 14 journaled in the bearing blocks 15 and 16 affixed to a frame member 7. The roller 10 is supported by spindles 17 and 18 journaled in the plates 19 and 20 pivoted on the spindles 13 and 14 of the roller 9. During the heating interval of the blank 3 at the first preheat station the roller 10 is positioned at the same level as the roller 9, the supporting plates 19 and 20 for the roller resting upon the wear pads 21 and 22 of the bearing blocks.

Both rollers 9 and 10 are rotated through the spur gears 23, 24 and 25, 26 on the spindles 13, 14 and 17, 18, respectively. The gears 23 and 25 are interconnected by an idler gear 27 supported on the plate 19 and the gears 24, 26 are interconnected by idler gear 28 on plate 20. The rollers 9 and 10 are driven continuously by an external power source (not shown) connected by the chain 29 to a sprocket 30 on the outer end of spindle 13 of the roller 9.

A continuously rotating blank 3 is heated at the first preheat station by an elongated gas-air burner 33 (Fig. 1) which extends the full length of the blank and which is attached to the frame 7 as shown at 34. Two shorter burners attached to the frame and directed at an angle toward the ends only of the blank are provided to compensate for heat losses at the ends of the blank to the rollers 9 and 10. One of such burners is shown at 35 in Fig. 1.

After a time interval sufficient to raise the temperature of a blank at the first preheat station above room temperature but substantially below the temperature at which the glass blank is softened, the blank is transferred from the stationary subassembly to the movable subassembly. This is accomplished by moving the roller 10 in a circular arc to a position above the level of the roller 9 to discharge the blank from the trough between rollers 9 and 10. The rollers 9 and 10 are shown in these relative positions in Figs. 1 and 2 with a blank 3, shown in broken lines in Fig. 1, about to be discharged from the trough therebetween.

The movement of the roller 10 above the level of roller 9 is affected during operation of the machine by turning the plates 19 and 20 on their pivots on the spindles 13 and 14 of the roller 9. The turning movement of the plates is affected through integral arms extending away from the pivot points of the plates and at angles in a downward direction from the plates 19 and 20. The arms carry at their outer ends rollers for engagement with parts, described below, of the movable subassembly as the latter is moved toward its blank receiving position. One of the arms is shown at 36 and a roller mounted on the end of the arm 36 is shown at 37 in Fig. 1.

As mentioned heretofore the above described parts of the stationary subassembly have corresponding parts in the movable subassembly in which the roller 11 corresponds to the roller 9 and the roller 12 corresponds to the roller 10. The corresponding parts in the movable subassembly are denoted by like numerals primed. The discharge of the blank 3 from the trough between the rollers 11 and 12 is accomplished in the same manner, that is by lifting roller 12 in a circular arc above the level of roller 11.

The parts on the movable subassembly for engaging the rollers 37 on the stationary subassembly consist of a pair of angle irons one of which is shown at 40 in Fig. 1 secured to a supporting cross member 41 which is mounted for reciprocal movement in a horizontal direction with respect to the stationary subassembly. As the cross member 41 moves toward the stationary subassembly the angle irons 40 engage the rollers 37 of the latter subassembly and turn the plates 19 and 20 on their pivots to lift the roller 10 and thus transfer the blank 3 from between the rollers 9 and 10 to the trough between the rollers 11 and 12.

The bearing blocks 15' and 16' of the movable subassembly are mounted on the cross member 41 which is in the form of an I-beam which engages and slides on a pair of stationary support rods 42 and 43 fastened to frame 7 and extending from front to back of the machine (Figs. 1 and 2).

The drive for the rollers 11 and 12 of the movable subassembly is shown in Fig. 5 of the drawing and includes a motor 44 connected by a chain 29' to the sprocket 30' or roller 11 to continuously rotate both rollers 11 and 12 through the gear train connecting these rollers.

The support beam 41 is moved along the support rods 42 and 43 from the position shown in full lines in Figs. 1 and 2 to the position shown in dot-dash lines in Fig. 1 and back again by rack members 46 affixed to the ends of the beam support 41 which are engaged by gears 47 mounted on the ends of a drive shaft 48 which in turn is driven by a gear 49 mounted along said shaft 48 and engaged by a single rack 50 actuated by an air cylinder 51 (Fig. 3) mounted on the frame 7.

The above-described drive mechanism for the support 41 is effective for shifting the movable subassembly laterally to a position beneath the burners 52 and 53 for again heating the blank 3 and back again to a blank pick-up position after delivery of the preheated blank to the mold 1 as described below. The burners 52 and 53 are identical to burners 33 and 35, respectively. Hereinafter, the position of a blank supported by rollers 9 and 10 beneath the flames of burners 33 and 35 will be referred to as the first preheat station and the position of a blank 3 supported by rollers 11 and 12 beneath the flames of burners 52 and 53 will be referred to as the second preheated station of the machine.

On delivery of the preheated blank 3 to the mold 1 the preheating thereof to a temperature slightly below the softening temperature of the glass of the blank is completed and the blank is ready for the heating of selected longitudinally extending and spaced apart portions thereof to a temperature at which the glass at said portions is plastic and for the reshaping of the plastic portions. This is accomplished by the parts of the machine shown at the left of Fig. 1 and described below.

The refractory press bed or mold 1 for receiving the preheated blank 3 from the preheat mechanism 5 is included in a subassembly 54 mounted on the frame 7 of the machine for horizontal reciprocal movement, as indicated by the arrows in Fig. 1, and which comprises, in addition to the mold 1, a metal frame 55 supporting the mold 1 and a fire brick bed 56 which extends from the mold 1 and beneath the preheat mechanism 5 in all three positions of the mold 1 described above to protect the parts of the machine located below the level of the subassembly 54 from the heat of the flames of the burners 4, 52, 53, 33 and 35 of the machine.

The frame 55 supporting the mold 1 is attached at one end to a cross-beam support member 57 engaging and slidable on the support rods 42 and 43. The support beam 55 and therewith the subassembly 54 is moved back and forth horizontally on the rods 42 by a drive similar to the drive of the reciprocal support beam 41 of the preheat mechanism 5. These drive parts for the subassembly 54 comprise rack members 58 located at the ends of the cross beam 57 which are engaged by the gears 59 mounted on the ends of the shaft 60 which is rotated through the gear 61 mounted between the ends of the shaft 60 and engaged by the rack 62 which is reciprocated by the air cylinder 63 shown in Figs. 3 and 6. The frame 55 rides on roller bearings 64 mounted on the machine frame 7.

Angle irons 66, similar to angle irons 40, are affixed to the support beam 57 and engage the rollers 37' to raise the roller 12 and transfer a preheated blank 3 from between the rollers 11 and 12 when the rollers 11 and 12 are at the second preheat station and when the mold is moved from its third to its first position. Tilted rails 67 are provided on mold 1 to support the preheated blank during this transfer of the blank.

An oil stop-check cylinder 68 (Fig. 3) is connected to the rack 62 of air cylinder 63 and is so controlled, as described later herein, as to hold the subassembly 54 at dwell with the mold 1 beneath the segmented burner 4, that is in the second position of the mold, for a time sufficient to heat to plasticity the exposed longitudinally extending separated areas of the blank 3 to be reshaped by the plunger 2 as shown in Fig. 6. The localized areas are heated to a temperature of approximately 1000° F. by the burner 4 in the case of a lime glass blank, for example. The burner 4 is supplied with a combustible gas air mixture through conduits 4'.

In order to maintain the part of the blank in contact with the wall of the mold cavity at a temperature just below the softening temperature of the glass to which temperature the blank has been preheated, that is, a temperature of approximately 900° F. for a lime glass envelope, for example, the mold is provided with continuously operating heating means in the form of sheathed electric heating elements 69 extending longitudinally through the mold and disposed to surround generally the cavity therein.

The operations of the air cylinder 51 of the preheat mechanism 5, the air cylinder 63 and the oil cylinder 68 actuating the subassembly 54 including the mold 1 are controlled and timed by the electrical system and air valves of the machine shown in Fig. 3 and described later herein.

The press bar or die plunger 2 is mounted for vertical reciprocal movement on the frame 7 of the machine and above the mold 1 in the third position of the latter, as shown in Fig. 1. The plunger 2 is reciprocated by an air cylinder 70 mounted on supports 71 and 71' on the frame 7. The piston 72 of the cylinder 70 is connected to the plunger 2 by the lever arm 73 pivoted at 74 on the support 71 and the connecting rod 75 pivoted on the end of the lever arm 73 and the middle of the I-beam 76 to which the die part 77 of the plunger 2 is attached. Thus the back and forth movement of the piston 72 in the air cylinder 70 causes reciprocal movement of the plunger 2 in a vertical plane. Pads of heat insulating material 78, such as asbestos pads, are interposed between the die part 77 and the supporting I-beam 76, to which the die part is bolted, to minimize heat transfer from the former to the latter.

The plunger 2 is guided in its reciprocal movement by a pair of upstanding posts 80 and 81 (Figs. 1 and 3) anchored at the top and bottom in parallel positions on the frame 7. The posts 80 and 81 are engaged by the slide members or collars 82 and 83 affixed to the beam 76 of the plunger 2. In order to maintain the beam 76 and therewith the die part of the plunger in a horizontal position as it is reciprocated in a vertical plane by the air cylinder 70, the machine is provided with a shaft 84 mounted for rotation on a stationary support member 85 attached to the frame 7 and having at its ends gears 86 which engage racks 87 on the slide members 82 and 83 to the beam 76. While only one gear 86 engaging rack 87 on slide member 82 has been shown in Fig. 1 it will be understood that a similar gear and rack is provided for slide member 83. The gears 86 are affixed to the shaft 84 so as to rotate therewith and the structure described is effective for preventing tilting of the die part 77 of the plunger 2 during its up and down movement.

The die part 77 of the plunger 2 is of the structure disclosed and claimed in the Shaw and Salo copending application referred to above. The part 77 is made of stainless steel or other suitable material and is provided with aligned downwardly projecting elongated protuberances 90 operated by cutout portions 91. The protuberances 90 present rounded surfaces to the blank 3 of smaller radius of curvature than that of the blank so that when the part 77 is moved toward the longitudinal axis of the blank 3 in the operation of the machine the plastic wall portions of the blank are folded inwardly thereby and the grooves 3' are formed in the blank. Means are provided as shown at 92 in Fig. 1 similar to the heating means 69 of the mold 1 for heating the die part 77 to a temperature approximating the softening temperature of the glass 1 of the blank 3. In addition to the electrical heating means 92, localized gas jets (not shown) directed at the corners 93 of the protuberances 90 may be utilized to assure sufficient heating of the parts of the protuberances engaging the plastic portions of the glass blank during the molding thereof by the plunger 2. This facilitates stretching of the glass next to the strengthening ribs 94 of the blank 3 which ribs are at a lower temperature than the reshaped portions of the glass blank during the reshaping. While one species of the die part has been shown in the drawing, it will be understood that die parts of different structure from that shown and described may be utilized in the machine to reshape the blank. For example, the plungers disclosed and claimed in the copending application of Shaw and Salo are useful in the machine of the present invention. As shown in Fig. 6 the mold 1 is insulated from the support beam 57 by heat pads 95 in frame 55 and is fastened as by bolts to beam 57.

In addition to the above-described elements for heating and reshaping the blanks the machine also comprises means for feeding blanks to the front of the machine and means for removing reshaped blanks from the back of the machine.

Figure 3:
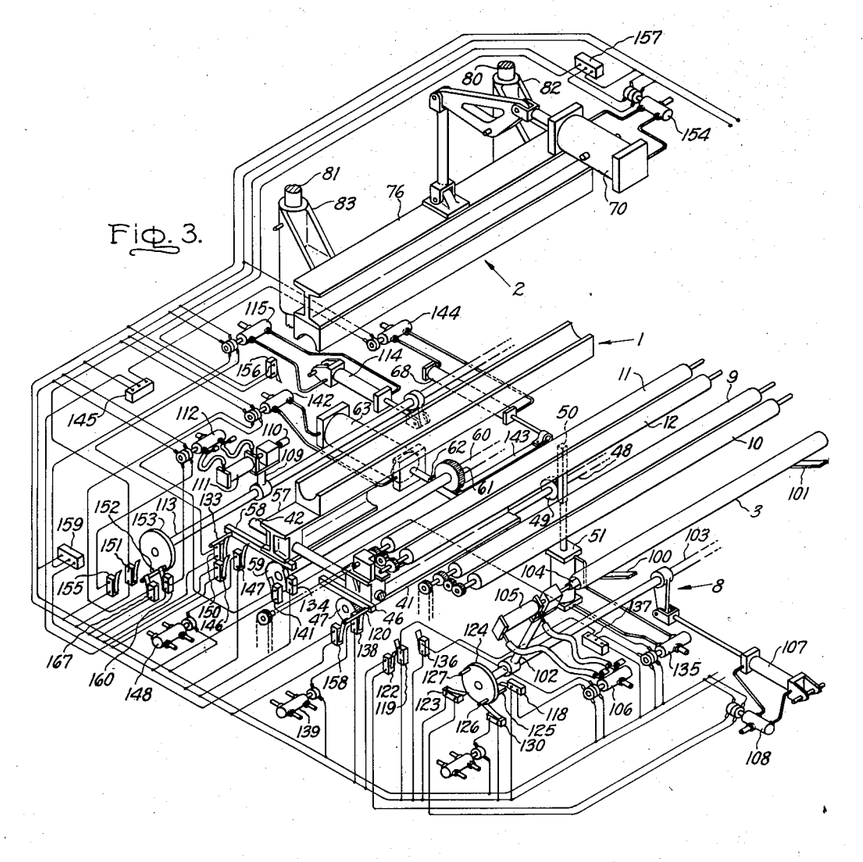
Fig. 3 is a fragmentary perspective view, partly schematic, of the operating elements of the machine together with the electrical triggering and timing elements and the pneumatic actuating parts connected therewith and showing also the blank feeding means at the front of the machine and the means for removing reshaped blanks at the back of the machine.
Figure 4:
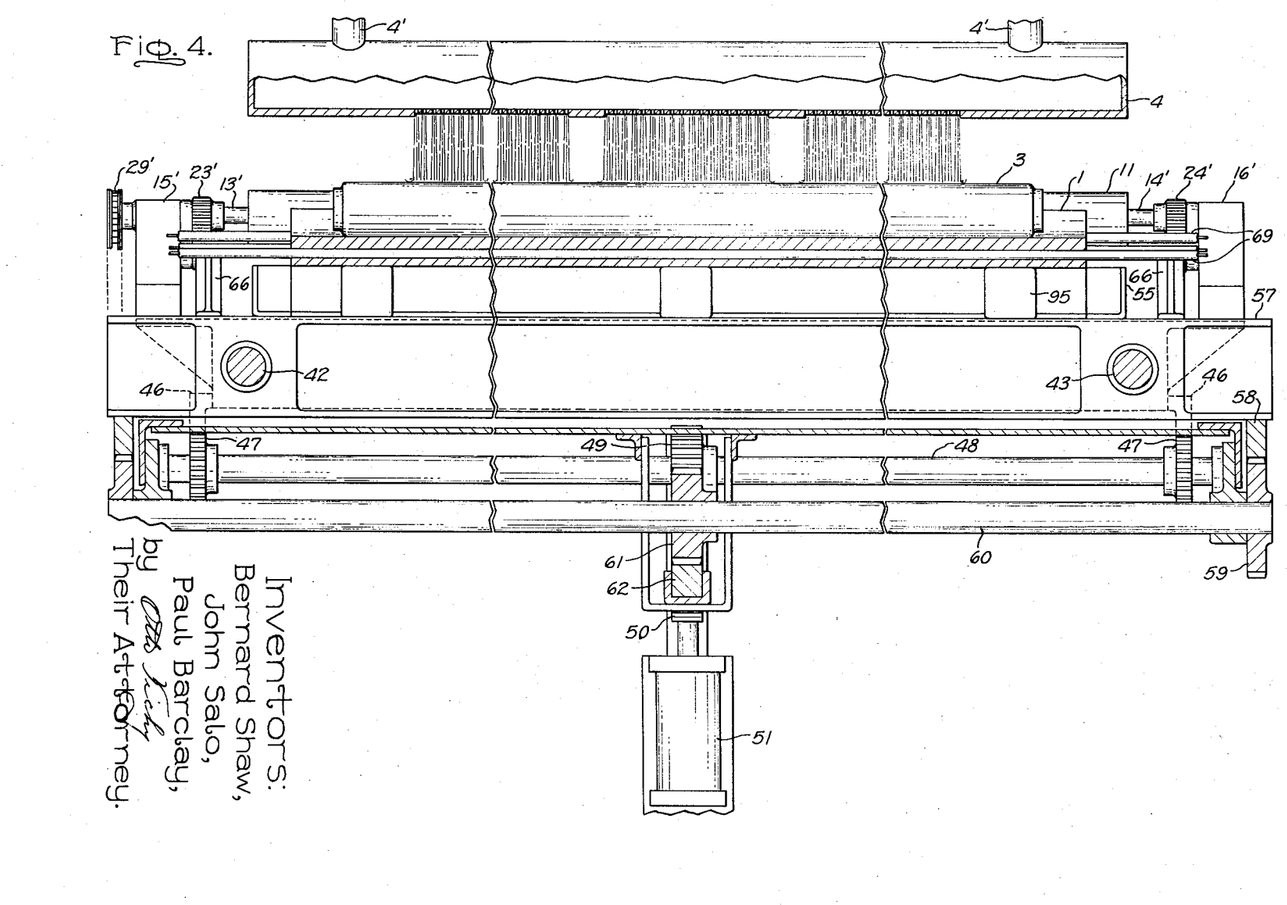
Fig. 4 is a vertical section through the machine along the dot-dash line 4—4 of Fig. 1 and showing the segmented burner and a blank in the mold in the second position of the mold.

In Fig. 3 of the drawing one side end only of the blank feeding means and the blank removing means has been shown for simplicity in illustration. Other parts of the machine such as the rollers 9, 10, 11 and 12 have been similarly shown. It will be understood that the opposite ends of these machine parts are of the same structure as the ends shown and described with obvious exceptions.

The blank feeding means is illustrated at 8 in Fig. 3 of the drawings and comprises a pair of spaced parallel elongated rails 100 and 101 on which a row of blanks 3 are supported. The rails slope downwardly so that when the foremost blank is lifted from the rails the succeeding blank assumes the position of the removed blank.

The feeding means also comprises a blank transfer mechanism which lifts a blank from the rails and places it in the valley or trough between the rollers 9 and 10 at the first preheat station of the machine. The transfer mechanism comprises a pair of arms 102 mounted at the ends of a common shaft 103 attached to the frame 7 (not shown) of the machine. The arms 102 carry at their outer or free ends pins 104 extending transversely inward between the arms and which are moved from a retracted position to a blank engaging position and back again by air cylinders 105 also mounted on the arms which are actuated by an air valve 106, as described below. The arms 102 are caused to swing from a position at which their ends are opposite the open ends of the blank 3 to a position at which the blank engaged by the pins is within the trough defined by the rollers 9 and 10 at the first preheat station by the air cylinder 107 which is pivoted at the center of the shaft 103 and on the frame 7 of the machine. The operation of the air cylinder 107 is actuated by the double-acting valve 108 as described hereinafter.

The means for removing the reshaped blanks 3 from the mold 1 at the back of the machine is shown at the left of Figs. 1, 2 and 3 and is similar in structure to the blank feeding means in that it comprises a pair of arms 109 having a pair of blank pick-up pins 110 thereon actuated by the air cylinders 111 and the valves 112 and mounted on a common shaft 113. The shaft 113 is rotated by an air cylinder 114 pivoted on the frame 7 of the machine and on the shaft 113 and actuated by the valve 115 shown at the right of Fig. 1 and Fig. 3. The operation of the blank removing means is described below.

The machine also comprises an interconnected electrical and pneumatic system for controlling, timing and actuating the operation of the above-described parts of the machine to heat and reshape a series of blanks automatically. The parts of the control, timing and actuating system are so arranged that during most of its operation the machine works on three blanks simultaneously at different sections thereof. In Figs. 1 and 2 of the drawings, the parts of the machine are shown in the relative positions whereat one reshaped blank 3 is about to be removed from the machine, a partially preheated blank has been transferred from the rollers 9 and 10 at the first preheat station to the rollers 11 and 12 and a blank is about to be lifted from the rack to the rollers 9 and 10 at the first preheat station. In Fig. 3 of the drawings the rollers 11 and 12 of the second preheat station are shown in their position beneath the burners 52 and 53 of this station.

The controls for one section of the machine are in many instances triggered by the operating mechanism of another section of the machine as will be apparent from the following description of the schematic representation of the control, timing and actuating system illustrated in Fig. 3.

Referring to Fig. 3, the blank feeding mechanism 8 is shown with the arm 102 in a blank pickup position and the pin 104 within the end of the blank 3. It will be understood that a duplicate arm and pin structure and an operating means for the pin is mounted on the opposite end of the part of the shaft 103 not shown in Fig. 3. The air cylinder 105 for the pin 104 is of the double direction type and air under pressure is supplied alternately to the ends of the cylinder through valve 106, connected by conduits to a reservoir (not shown) of air under pressure, to cause the piston of the air cylinder 105, to which the pin 104 is affixed, to move in opposite directions. The valve ports are opened and closed to affect this operation by individual solenoids integral with the valve 106.

Valves and air cylinders of this type are known in the art and are available commercially. The machine comprises a plurality of such valves and cylinders and also a plurality of switches comprising casings and lever arms and timing mechanisms of known structure and commercial availability. A detailed description and an illustration of these known elements of the machine have been omitted as unnecessary for a complete understanding of the invention by those skilled in the art.

The operation of the valve 106 of the feed mechanism 8 is controlled by two switches 118 and 119. The switch 119 is tripped by the rod 120 affixed to the rack 46 on the beam support 41 of the rollers 11 and 12 as the support 41 is moved toward the first preheat station and momentarily energizes the solenoid of valve 106 affecting the advance of the pin 104 into the end of the blank 3. The switch 119 assumes its normally open position after the rod 120 has passed and as the support 41 continues its movement in the direction of the first preheat station. Switch 118 energizes the solenoid of valve 106 affecting retraction of the pin 104 and is triggered as described below after the blank 3 has been transferred from the rails 100 and 101 to the rollers 9 and 10 at the first preheat station.

The solenoids of valve 108 of the feed mechanism 8 are energized by switches 122 and 123, switch 122 being tripped by rod 120 after the latter has tripped switch 119 and the support 41 has reversed its direction of travel and is moving away from the first preheat station. At this time a blank 3 has been transferred from the rollers 9 and 10 at the first preheat station to the rollers 11 and 12 and is being carried beneath the burners 52 and 53 at the second preheat station. Switch 119 is provided with an actuating lever arm which is hinged in such manner that the switch 119 is not tripped by rod 120 during this return movement of the support 41. Switch 122 energizes the solenoid of valve 108 causing the arms 102 to swing inward and carry a blank engaged by the pins 104 from the rails 100 and 101 to the rollers 9 and 10 at the first preheat station.

As the arms 102 near the end of their inward swing the pin retracting switch 118 is tripped to release the blank. Switch 118 is tripped by the switch disk 124 mounted on the shaft 103 and having at its peripheral portion switch tripping pins 125, 126 and 127. As the shaft 103 and therewith the disk 124 continue to turn after pin 125 trips switch 118 the switch 123 is also tripped by the pin 127 as the arms 102 reach their blank delivery position, thus energizing the solenoid of valve 106 to cause the arms 102 to swing outward back to their blank pickup position.

When the arms are in their blank pickup position the switch 130 is moved to its make position by the pin 126 on the disk 124 to energize the valve 131. The valve 131 actuates conventional means (not shown) which ignites the burners 33 and 35 at the first preheat station when the valve 131 is energized by closing of switch 130. After the preheat of the transferred blank at the first preheat station is completed and the reciprocal roller support 41 is moved from its position beneath the burners 52 and 53 at the second preheat station toward the first preheat station and starts on its return movement to trip the switch 122 and thus start the movement of the arms 104 of the transfer mechanism inward of the machine, the switch 130 is broken by the rotation of the disk 124 to shut off the burners 33 and 35 at the first preheat station until completion of the delivery of the succeeding blank to the rollers 9 and 10 at the first preheat station of the machine.

This cycle of operation of the transfer mechanism of the feeding means and the burners 33 and 35 at the first preheat station is repeated for processing a series of blanks by the machine.

From the foregoing, it is apparent that the initiation of the cycle of operation of the blank transfer mechanism and the burners at the first preheat station of the machine is dependent upon the operation of the part of the preheat mechanism including the rollers 11 and 12 and specifically upon the movements of the reciprocal roller support 41. Similarly, the movements of the reciprocal support 41 and the operation of the burners 52 and 53 at the second preheat station are dependent in part upon the operation of the reciprocal press bed or mold assembly 54 and in the following manner.

As the assembly 54 is moved from its third toward its first position, that is, toward the roller support 41 with the latter at the second preheat station, to pickup a preheated blank in the manner described in connection with Fig. 1, the rod 133 affixed to the rack 58 on support 57 of assembly 54 trips the switch 134 as the assembly 54 reaches its limit of travel. This energizes the solenoid of valve 135 which causes the roller support 41 to move from beneath the preheat burners 52 and 53 at the second preheat station toward the first preheat station. The machine parts involved in this particular operation are so arranged with respect to each other that a preheated blank 3 is transferred from the rollers 11 and 12 to the mold 1 without interference by the movement of the said roller support 41 toward the first preheat station.

The return movement of the roller support 41 toward the second preheat station after a blank has been transferred to the rollers 11 and 12 from the rollers 9 and 10 as described above is affected by switch 136 which is tripped by rod 120 as the roller support 41 reaches its limit of travel toward the first preheat station. The return movement of the reciprocal support 41 is under the control of an adjustable timer 137 connected between the switch 136 and the solenoid of valve 135 which causes the air cylinder 51 acting through rack 50, gear 49, shaft 48, gear 47 and rack 46 to return the roller support 41 to a position beneath the burners 52 and 53 at second preheat station. The timer 137 delays the return movement of the reciprocal support 41 until a blank 3 has been transferred from one set of rollers 9 and 10 to the next, 11 and 12.

The operation of the burners 52 and 53 at the second preheat station is controlled through the switch 138 and the valve 139. The switch 138 is closed by the rod 120 when the roller support 41 nears its limit of travel toward the second preheat station and this energizes a solenoid of the valve 139 which affects ignition of the burner. The switch 138 moves to an open position to shut off the burners 52 and 53 as the roller support 41 is moved again toward the first preheat station.

While the mold assembly 54 is shown in its third position in Figs. 1, 2 and 3 for the sake of clarity of illustration, the following describes the operation of the assembly 54 and the elements of the electrical and pneumatic system of the machine associated therewith starting with mold 1 of the assembly 54 in its first or blank receiving position and as it is moved toward its second and third positions, and thereafter back to its first position. The sequence of operations of the machine on a single blank as the latter is moved through the machine thus can be readily followed.

The movement of the assembly 54 from its first toward its second position after receiving a preheated blank from rollers 11 and 12 is initiated by the switch 141 which is tripped by the rod 133 on rack 58 of support beam 57 of assembly 54 as the latter reaches the limit of travel of the mold 1 from its third to its first position. The switch 141 when tripped energizes the solenoid in valve 142 which causes the air cylinder 63 to move its piston having rack 62 in the direction effective for moving the assembly 54 toward its third position through parts 58 to 61 of the assembly 54.

In order to stop and retain the assembly 54 at its second position with a blank 3 in the mold 1 below the segmented burner 4, an overriding control is provided. This control is comprised of the oil stop-check cylinder 68 connected in parallel with the air cylinder 63 of the assembly 54 by strap 143 fastened to rack 62; a valve 144 controlling the oil cylinder 68; a timer 145 connected in series between the valve 144 and the switch 146. The switch 146 is tripped by the rod 133 of the assembly 54 as the latter moves away from its first position and the tripping thereof actuates the valve 144 which stops the flow of oil between the ends of the cylinder 68 to stop the movement of the pistons of the oil cylinder and the air cylinder 63 with the blank in the mold 1 positioned below the segmented burner 4. The timer 145 maintains the circuit to the valve 144 for the prescribed heating period for the blank 3 with the mold assembly 54 in its second position.

The segmented burner 4 is ignited through the switch 147 and the valve 148 which switch is moved by rod 133 to a contact making position as the assembly 54 approaches its second position and moves to a contact breaking position as the assembly 54 is moved from its second toward its third position. The compressed air connection to the cylinder 63 is maintained throughout the interval the assembly 54 remains at its second position and serves to move the assembly from its second to its third position. The movement of the assembly 54 from its second toward its third position takes place when the timer 145 breaks the electrical circuit to the valve 144 to again allow oil to flow in the cylinder 68. This movement of the press bed breaks the switch 147 to actuate the valve 148 and shut off segmented burner 4 thus extinguishing the flame.

With the assembly 54 thus moved into its third position the blank in the mold 1 is ready for reshaping by the press die or plunger 2 as the latter is moved downward toward the mold 1 therebeneath.

The downward movement of the plunger 2 is initiated in an indirect but effective manner by means causing the inward movement of the arms 109 of the blank removal mechanism as the arms 109 are swung inwardly toward their blank engaging and takeout position with respect to the mold 1. The arms are swung inwardly from the outer positions thereof shown in Fig. 3 by the air cylinder 114 connected to the shaft 113 and controlled by the double solenoid valve 115. The solenoid or valve 115 causing the arms 109 to swing inward to their blank pickup position is energized by switch 150 which is moved to a closed position by the rod 133 of the assembly 54 as the latter approaches its limit of travel from its second into its third position.

The downward movement of the plunger 2 occurs when the arms 109 are swung in as described above and the switch 151 is thus moved to a contact making position by the pin 152 on the disk 153 affixed to the end of the shaft 113 supporting the takeout arms 109. Switch 151 energizes the solenoid in valve 154 actuating the air cylinder 70 to move the plunger 2 downward by the linkage described in connection with Fig. 1. This pin 152 also trips switch 155 to energize the solenoid of valve 112 causing the pins 110 on the takeout arms 109 to move into the ends of the blank 3 in the mold 1 in position to remove the reshaped blank after reshaping by the plunger. The plunger when thus lowered engages the plastic portions of the blank in the mold 1 to reshape the blank as described above.

In its downward movement toward the blank the plunger 2 trips switch 156 which actuates the timer 157 connected to the valve 154 and which is effective, after a predetermined time, for energizing the solenoid of the valve 154 which causes the air cylinder 70 to lift the plunger 2 after reshaping the blank.

After the plunger 2 is lifted the reshaped blank is removed from the mold 1 by the takeout mechanism 6. The removal of the blank is effected through the switch 158 which is moved to a closed position by the rod 120 on the roller support 41 as the latter arrives at the second preheat station. The switch 158 energizes the timer 159 which, after a length of time sufficient for the reshaped parts of the blank to cool below the plastic temperature of the reshaped parts (about forty seconds in the case of lime glass lamp envelopes commonly designated 48T17), energizes the solenoid of valve 115 which causes the arms 109 to swing outward. As the arms reach their outermost position carrying the reshaped blank, the switch 160 is tripped by pin 152 to energize the solenoid of valve 112 causing retraction of the pins 110 from the ends of the blank. The released blank then falls onto the slide 161 (Fig. 1) for removal to an annealing oven.

The return movement of the press bed or mold 1 from its third into its first position after its dwell at the third position is effected through the tripping of switch 162 by the pin 152 as the arms 109 approach their full-out position. The switch 162 energizes the solenoid of valve 142 which causes the cylinder 63 to move the assembly 54 toward its first position to pick up another preheated blank at the second preheat station as described heretofore.

The machine automatically repeats the above-described cycle of operation to reshape a series of blanks.

The timers 159, 157, 145 and 137 controlling various operations of the machine may be adjusted to prolong or shorten the time periods of the various operations performed by the machine on the blank to adapt the machine for reshaping blanks of different physical characteristics and dimensions. With blanks designated 48T17 an adjustment of the timers to preheat the blanks for about 40 seconds, to hold the blanks under the segmented burner 4 for about 3 seconds and to allow the blanks to remain in the mold 1 for about 40 seconds after reshaping is effective. Blanks designated 48T17 are fluorescent lamp tubular envelopes of lime glass slightly less than 48 inches in length, having an outer diameter of approximately 2⅛ inches and a wall thickness of 0.075 inch.

While a preferred embodiment of the invention and the best mode of carrying out the invention has been shown and described to comply with the patent statutes it will be understood, of course, that numerous changes in the form and details of the apparatus may be made by those skilled in the art without departing from the spirit and scope of the invention as defined in the appended claims, for example, the number of grooves formed in the blank may be changed by changing the number of protuberances 90 provided on the press die or plunger 2.

What we claim as new and desire to secure by Letters Patent of the United States is:

1. An apparatus for reshaping cylindrical glass tube blanks to provide aligned re-entrant spaced apart grooves extending longitudinally along one side of the blanks comprising a supporting frame, blank heating means mounted on said frame for heating the entire blank to a temperature slightly below the temperature at which the glass of the blank is plastic, blank reshaping means mounted for reciprocation on said frame between blank engaging and blank disengaging positions, said reshaping means being spaced from said heating means on said frame and having elongated aligned spaced apart groove forming protuberances provided with blank engaging surfaces rounded in cross section and of smaller radius of curvature than said blanks, segmented heating means mounted on said frame in fixed position between said entire blank heating means and said blank reshaping means for heating to plasticity longitudinally extending spaced apart portions on one side of the blanks for engagement by the protuberances of said reshaping means, said apparatus comprising also a blank supporting press bed mounted for movement on said frame into a blank receiving first position with respect to said entire blank heating means, a second position in which a blank is supported thereby in heat receiving relation to said segmented heating means and a third position in which a blank is supported for engagement by said reshaping means, and actuating and timing means mounted on said frame and inter-connecting said press bed and said reshaping means to move said press bed into said positions in sequence with a dwell period at said second and third positions and to move said reshaping means from a blank disengaging to a blank engaging position and back again with said press bed in its third position.

2. An apparatus for reshaping cylindrical glass tube blanks to provide aligned re-entrant spaced apart grooves extending longitudinally along one side of the blanks comprising a supporting frame, blank heating means mounted on said frame for heating the entire blank to a temperature slightly below the temperature at which the glass of the blank is plastic, blank reshaping means mounted for reciprocation on said frame between blank engaging and blank disengaging positions, said reshaping means being spaced from said heating means on said frame and having elongated aligned spaced apart groove forming protuberances provided with blank engaging surfaces rounded in cross section and of smaller radius of curvature than said blanks, segmented heating means mounted on said frame in fixed position between said entire blank heating means and said blank reshaping means for heating to plasticity longitudinally extending spaced apart portions on one side of the blanks for engagement by the protuberances of said reshaping means, said apparatus comprising also a blank supporting press bed mounted for movement on said frame into a blank receiving first position with respect to said entire blank heating means, a second position in which a blank is supported thereby in heat receiving relation to said segmented heating means and a third position in which a blank is supported for engagement by said reshaping means, said press bed comprising heating means for maintaining the portion of a supported blank in contact with the press bed at a temperature slightly below the temperature at which the glass of the blank is plastic, and actuating and timing means mounted on said frame and inter-connecting said press bed and said reshaping means to move said press bed into said positions in sequence with a dwell period at said second and third positions and to move said reshaping means from a blank disengaging to a blank engaging position and back again with said press bed in its third position.

3. An apparatus for reshaping cylindrical glass tube blanks to provide aligned re-entrant spaced apart grooves extending longitudinally along one side of the blanks comprising a supporting frame, blank heating means mounted on said frame for heating the entire blank to a temperature slightly below the temperature at which the glass of the blank is plastic, blank reshaping means mounted for reciprocation on said frame between blank engaging and blank disengaging positions, said reshaping means being spaced from said heating means on said frame and having elongated aligned spaced apart groove forming protuberances provided with blank engaging surfaces rounded in cross section and of smaller radius of curvature than said blanks, segmented heating means mounted on said frame in fixed position between said entire blank heating means and said blank reshaping means for heating to plasticity longitudinally extending spaced apart portions on one side of the blanks for engagement by the protuberances of said reshaping means, said apparatus comprising also a blank supporting press bed mounted for movement on said frame into a blank receiving first position with respect to said entire blank heating means, a second position in which a blank is supported thereby in heat receiving relation to said segmented heating means and a third position in which a blank is supported for engagement by said reshaping means, and actuating and timing means mounted on said frame and interconnecting said press bed and said reshaping means to move said press bed into said positions in sequence with a dwell period at said second and third positions and to return said press bed directly to said first position from said third position and to move said reshaping means from a blank disengaging to a blank engaging position and back again with said press bed in its third position.

4. An apparatus for reshaping cylindrical glass tube blanks to provide aligned re-entrant spaced apart grooves extending longitudinally along one side of the blanks comprising a supporting frame, blank heating means mounted on said frame for heating the entire blank to a temperature slightly below the temperature at which the glass of the blank is plastic, blank reshaping means mounted for reciprocation on said frame between blank engaging and blank disengaging positions, said reshaping means being spaced from said heating means on said frame and having elongated aligned spaced apart groove forming protuberances provided with blank engaging surfaces rounded in cross section and of smaller radius of curvature than said blanks, segmented heating means mounted on said frame in fixed position between said entire blank heating means and said blank reshaping means for heating to plasticity longitudinally extending spaced apart portions on one side of the blanks for engagement by the protuberances of said reshaping means, said apparatus comprising also a blank supporting press bed mounted for movement on said frame into a blank receiving first position with respect to said entire blank heating means, a second position in which a blank is supported thereby in heat receiving relation to said segmented heating means and a third position in which a blank is supported for engagement by said reshaping means and blank removing means including arms pivoted on said frame for movement between a lowered blank engaging position juxtaposed to said press bed in its third position and a lifted blank removing position and actuating and timing means mounted on said frame and interconnecting said press bed, said reshaping means and said blank removing means to move said press bed into said positions in sequence with a dwell period at said second and third positions, to move said reshaping means from a blank disengaging to a blank engaging position and back again with said press bed in its third position and to move the arms of said blank removal means from a lowered to a lifted position with said press bed in its third position and said blank reshaping means in a blank disengaging position.

5. An apparatus for reshaping cylindrical glass tube blanks to provide aligned re-entrant spaced apart grooves extending longitudinally along one side of the blanks comprising a supporting frame, blank heating means mounted on said frame for heating the entire blank to a temperature slightly below the temperature at which the glass of the blank is plastic, blank reshaping means mounted for reciprocation on said frame between blank engaging and blank disengaging positions, said reshaping means being spaced from said heating means on said frame and having elongated aligned spaced apart groove forming protuberances provided with blank engaging surfaces rounded in cross section and of smaller radius of curvature than said blanks, segmented heating means mounted on said frame in fixed position between said entire blank heating means and said blank reshaping means for heating to plasticity longitudinally extending spaced apart portions on one side of the blanks for engagement by the protuberances of said reshaping means, said apparatus comprising also a blank supporting press bed mounted for movement on said frame into a blank receiving first position with respect to said entire blank heating means, a second position in which a blank is supported thereby in heat receiving relation to said segmented heating means and a third position in which a blank is supported for engagement by said reshaping means, a blank removing means comprising arms pivoted on said frame for movement between a lowered blank engaging position juxtaposed to said press bed in its third position and a lifted blank removal position and blank feeding means including arms pivoted on said frame for movement between a swung-out blank pick-up position and a swung-in blank delivery position juxtaposed to said blank heating means and actuating and timing means mounted on said frame and interconnecting said press bed, said reshaping means, said blank removing means and said blank feeding means to move said press bed into its said positions in sequence with a dwell period at said second and third positions, to move said reshaping means from a blank disengaging to a blank engaging position and back again with said press bed in its third position, to move said blank removal means from a lowered to a lifted position with said press bed in its third position and said reshaping means in a blank disengaging position and to move the arms of said blank feeding means from a swung-out position to a swung-in position with said press bed in its second position.

6. An apparatus for reshaping cylindrical glass tube blanks to provide aligned re-entrant spaced apart grooves extending longitudinally along one side of the blanks comprising a supporting frame, blank heating means mounted on said frame for heating the entire blank to a temperature slightly below the temperature at which the glass of the blank is plastic, said blank heating means including a blank supporting mechanism having a pair of rollers mounted for rotation in spaced parallel positions on support members pivoted at one end of said frame, said rollers providing a blank receiving trough therebetween and said support member having integral arms extending beyond the pivots and at an angle to the support members for tilting said mechanism to discharge a blank from between said rollers when depressed, blank reshaping means mounted for reciprocation on said frame between blank engaging and blank disengaging positions, said reshaping means being spaced from said heating means on said frame and having elongated aligned spaced apart groove forming protuberances provided with blank engaging surfaces rounded in cross section and of smaller radius of curvature than said blanks, segmented heating means mounted on said frame in fixed position between said entire blank heating means and said blank reshaping means for heating to plasticity longitudinally extending spaced apart portions on one side of the blanks for engagement by the protuberances of said reshaping means, said apparatus comprising also a blank supporting press bed mounted for movement on said frame into a blank receiving first position with respect to said entire blank heating means, a second position in which a blank is supported thereby in heat receiving relation to said segmented heating means and a third position in which a blank is supported for engagement by said reshaping means, and actuating and timing means mounted on said frame and interconnecting said press bed and said reshaping means to move said press bed into said positions in sequence with a dwell period at said second and third positions and to return said press bed directly to said first position from said third position to engage and depress the arms of the blank support mechanism, and to move said reshaping means from a blank disengaging to a blank engaging position and back again with said press bed in its third position.

7. Apparatus for reshaping elongated cylindrical glass tubes to provide aligned re-entrant spaced apart grooves extending longitudinally along one side of the tubes comprising a supporting frame, tube heating means affixed to said frame and tube reshaping means mounted for reciprocation on said frame between a tube engaging and a tube disengaging position, said reshaping means being spaced from said heating means and being in a tube disengaging position normally on said frame and having elongated aligned spaced apart groove forming protuberances provided with tube engaging surfaces rounded in cross section and of smaller radius of curvature than said tubes, said heating means being segmented for heating to plasticity longitudinally extending spaced apart portions on one side of the tubes for engagement by the protuberances of said reshaping means, said apparatus comprising also a tube supporting press bed mounted on said frame for movement successively to said segmented heating means and to said reshaping means to position for engagement by the protuberances of said reshaping means the plastic portions of a tube carried by said press bed, individual actuating means on said frame for said press bed and said tube reshaping means and control means on said frame for said actuating means to so move said press bed and to move said reshaping means from its tube disengaging into its tube engaging position and back again with said press bed at said reshaping means.

References Cited in the file of this patent
UNITED STATES PATENTS

| | | |
|---|---|---|
| 1,489,836 | King | Apr. 8, 1924 |
| 2,482,421 | Lemmers | Sept. 20, 1949 |
| 2,523,006 | Gaskill et al. | Sept. 19, 1950 |
| 2,529,678 | Casselle | Nov. 14, 1950 |